United States Patent
Kasuya et al.

(10) Patent No.: US 8,881,523 B2
(45) Date of Patent: Nov. 11, 2014

(54) WASTE HEAT UTILIZATION DEVICE FOR INTERNAL COMBUSTION ENGINE

(75) Inventors: Junichiro Kasuya, Isesaki (JP); Tetsuya Nakano, Isesaki (JP); Tomohiko Saito, Sagamihara (JP); Masaaki Tokuda, Machida (JP); Satoshi Ogiwara, Fujisawa (JP)

(73) Assignee: Sanden Corporation, Gunma (JP)

( * ) Notice: Subject to any disclaimer, the term of this patent is extended or adjusted under 35 U.S.C. 154(b) by 855 days.

(21) Appl. No.: 13/061,513

(22) PCT Filed: Aug. 25, 2009

(86) PCT No.: PCT/JP2009/064781
§ 371 (c)(1),
(2), (4) Date: May 23, 2011

(87) PCT Pub. No.: WO2010/024246
PCT Pub. Date: Mar. 4, 2010

(65) Prior Publication Data
US 2012/0111003 A1  May 10, 2012

(30) Foreign Application Priority Data

Aug. 26, 2008 (JP) ................. 2008-216647

(51) Int. Cl.
*F01K 23/10* (2006.01)
*F01K 23/06* (2006.01)
(Continued)

(52) U.S. Cl.
CPC . *F02G 5/04* (2013.01); *Y02E 20/14* (2013.01); *F01N 5/02* (2013.01);
(Continued)

(58) Field of Classification Search
USPC ........................................... 60/618
See application file for complete search history.

(56) References Cited

U.S. PATENT DOCUMENTS 5,000,003 A * 3/1991 Wicks ............................. 60/618
7,454,910 B2 * 11/2008 Hamada et al. ................. 60/618
(Continued)

FOREIGN PATENT DOCUMENTS

EP  1326009  7/2003
EP  1925806  5/2008
(Continued)

OTHER PUBLICATIONS

English Translation of EP 2284458 A1.*
(Continued)

*Primary Examiner* — Thomas Denion
*Assistant Examiner* — Jessica Kebea
(74) *Attorney, Agent, or Firm* — Cozen O'Connor (57) ABSTRACT

A Rankine cycle (6) of a waste heat utilization device includes a circulation path (7) for circulating a working fluid therethrough, an evaporator (12) for causing heat to transfer from cooling water delivered from an internal combustion engine (2) to the working fluid to evaporate the working fluid, a superheater (10) for causing heat to transfer from the cooling water delivered from an exhaust gas heat exchanger (8) to the working fluid delivered from the evaporator to superheat the working fluid, an expander (22) for expanding the working fluid delivered from the superheater to produce driving force, a condenser (24) for condensing the working fluid delivered from the expander, and a pump (28) for feeding the working fluid delivered from the condenser to the evaporator. The evaporator, the superheater, the expander, the condenser and the pump are successively inserted in the working fluid circulation path.

9 Claims, 7 Drawing Sheets (51) Int. Cl.
   *F01K 25/00*   (2006.01)
   *F02B 27/00*   (2006.01)
   *F02B 27/02*   (2006.01)
   *F01N 5/02*    (2006.01)
   *F01K 13/02*   (2006.01)
   *F01P 9/06*    (2006.01)
   *F02G 5/04*    (2006.01)
   *F01K 25/08*   (2006.01)
   *F01P 7/16*    (2006.01)

(52) U.S. Cl.
   CPC ............ *Y02T 10/166* (2013.01); *F01P 7/162* (2013.01); *F01K 13/02* (2013.01); *F02G 2260/00* (2013.01); *F01P 9/06* (2013.01); *F01K 23/065* (2013.01); *Y02T 10/16* (2013.01); *F01N 2240/02* (2013.01); *F01P 2050/24* (2013.01)
   USPC ............ 60/618; 60/670; 60/671; 60/651; 62/323.1; 62/238.6

(56) References Cited

U.S. PATENT DOCUMENTS

| | | | |
|---|---|---|---|
| 7,454,912 B2 * | 11/2008 | Yamanaka et al. | 60/618 |
| 7,520,133 B2 * | 4/2009 | Hoetger et al. | 60/618 |
| 8,528,333 B2 * | 9/2013 | Juchymenko | 60/618 |
| 2004/0050052 A1 * | 3/2004 | Niikura et al. | 60/670 |
| 2005/0050909 A1 | 3/2005 | Nagatani et al. | 62/323.1 |
| 2005/0144949 A1 | 7/2005 | Hamada et al. | 60/670 |
| 2005/0262842 A1 * | 12/2005 | Claassen et al. | 60/618 |
| 2006/0144047 A1 * | 7/2006 | Inaba et al. | 60/618 |
| 2009/0211253 A1 * | 8/2009 | Radcliff et al. | 60/670 |
| 2009/0320477 A1 * | 12/2009 | Juchymenko | 60/651 |
| 2010/0294217 A1 * | 11/2010 | Kasuya et al. | 123/41.55 |
| 2010/0307155 A1 * | 12/2010 | Kasuya et al. | 60/666 |
| 2011/0048009 A1 * | 3/2011 | Smith et al. | 60/645 |
| 2011/0088397 A1 * | 4/2011 | Mori et al. | 60/661 |
| 2011/0192163 A1 * | 8/2011 | Kasuya | 60/624 |
| 2014/0165567 A1 * | 6/2014 | Nagai et al. | 60/670 |

FOREIGN PATENT DOCUMENTS

| | | | | |
|---|---|---|---|---|
| EP | 2284458 A1 * | 2/2011 | | |
| FR | 2868809 A1 * | 10/2005 | | |
| JP | 57-099222 | 6/1982 | | |
| JP | 2005282363 A * | 10/2005 | ............ | F01K 23/10 |
| JP | 2006-232006 | 9/2006 | | |
| JP | 2008-38916 | 2/2008 | | |
| JP | 2008-128254 | 6/2008 | | |
| JP | 2008184906 A * | 8/2008 | | |
| JP | 2008255959 A * | 10/2008 | | |
| JP | 2009185773 A * | 8/2009 | | |
| JP | 2010229999 A * | 10/2010 | | |
| JP | 2013076369 A * | 4/2013 | | |
| WO | WO 2005103453 A1 * | 11/2005 | | |
| WO | WO 2009133620 A1 * | 11/2009 | ............... | F02G 5/02 |

OTHER PUBLICATIONS

English Translation of JP 2008184906A.*
Extended European Search Report dated Jul. 4, 2011.

* cited by examiner

WASTE HEAT UTILIZATION DEVICE FOR INTERNAL COMBUSTION ENGINE

RELATED APPLICATIONS

This U.S. National Phase Application under 35 USC §371 of International Application PCT/JP2009/064781 filed on Aug. 25, 2009.

This application claims the priority of Japanese Patent Application No. 2008-216647 filed Aug. 26, 2008, the entire content of which is hereby incorporated by reference.

TECHNICAL FIELD

The present invention relates to waste heat utilization devices for internal combustion engines, and more particularly, to a waste heat utilization device suited for use with an internal combustion engine mounted on a motor vehicle.

BACKGROUND ART

A waste heat utilization device for an internal combustion engine is mounted on a motor vehicle, for example. This type of waste heat utilization device is provided with a Rankine cycle including a circulation path for circulating a refrigerant as a working fluid therethrough, and an evaporator for heating the refrigerant by means of waste heat of the engine of the vehicle, an expander for expanding the refrigerant delivered from the evaporator to produce driving force, a condenser for condensing the refrigerant delivered from the expander and a pump for pressurizing the refrigerant delivered from the condenser to be fed to the evaporator are successively inserted in the circulation path. The Rankine cycle recovers the waste heat from the engine.

A heat engine has been disclosed in which ethylene glycol is used as an intermediate medium for absorbing waste heat of the cylinder block of the engine as well as waste heat of the exhaust gas so that the heat absorbed by the ethylene glycol may be transferred to the refrigerant (see Patent Document 1, for example).

Also, a technique has been disclosed in which a cooling water circuit using Long Life Coolant (LLC) as engine cooling water is provided and an exhaust gas heat exchanger for transferring heat from the exhaust gas to the LLC is inserted in the circulation path of the cooling water circuit (see Patent Document 2, for example).

PRIOR ART LITERATURE

Patent Documents

Patent Document 1: Japanese Examined Patent Publication No. 62-39652
Patent Document 2: Japanese Laid-open Patent Publication No. 2006-232006

SUMMARY OF THE INVENTION

Problems to be Solved by the Invention

Generally, the ratio of the amount of waste heat of the engine cylinder block to the amount of waste heat of the exhaust gas is approximately 2:1 to 4:1.

In the above conventional techniques, however, the total amount of ethylene glycol or LLC sufficient to absorb the larger amount of waste heat from the cylinder block is made to flow through the exhaust gas heat exchanger, posing a problem that the temperature of the intermediate medium or cooling water rises only to a limited extent in the exhaust gas heat exchanger.

Also, since the total amount of ethylene glycol or LLC is caused to flow through the exhaust gas heat exchanger, another problem arises in that the pressure loss of the intermediate medium or cooling water in the exhaust gas heat exchanger is large.

Further, the ethylene glycol or LLC heated in the exhaust gas heat exchanger is used chiefly to evaporate the refrigerant, so that the refrigerant is insufficiently superheated and expanded to form a two-phase flow, possibly lowering the regeneration efficiency.

Generally, the cooling water circuit is provided with a cooling water pump driven by the engine to circulate the cooling water through the cooling water circulation path. When the cooling water pump is stopped because of stoppage of the engine, however, the cooling water remains in the exhaust gas heat exchanger and is possibly heated by the residual heat of the exhaust gas to an extent such that the cooling water present in the exhaust gas heat exchanger boils and produces high pressure, possibly damaging the cooling water circuit and thus the waste heat utilization device.

The present invention was created in view of the above circumstances, and an object thereof is to provide a waste heat utilization device for an internal combustion engine whereby the amount of heat recovered by a Rankine cycle and thus the amount of energy recovered by the waste heat utilization device can be easily and reliably increased while ensuring operation reliability of the waste heat utilization device.

Means for Solving the Problems

To achieve the object, a waste heat utilization device for an internal combustion engine, preferably comprises: a cooling water circuit including a circulation path for circulating cooling water therethrough via the engine, and an exhaust gas heat exchanger inserted in the circulation path to cause heat to transfer from exhaust gas discharged from the engine to part of the cooling water which has been heated while cooling a body of the engine, to additionally heat the cooling water; and a Rankine cycle including a circulation path for circulating a working fluid therethrough, an evaporator for causing heat to transfer from the cooling water delivered from the engine to the working fluid to evaporate the working fluid, a superheater for causing heat to transfer from the cooling water delivered from the exhaust gas heat exchanger to the working fluid delivered from the evaporator to superheat the working fluid, an expander for expanding the working fluid delivered from the superheater to produce driving force, a condenser for condensing the working fluid delivered from the expander, and a pump for feeding the working fluid delivered from the condenser to the evaporator, wherein the evaporator, the superheater, the expander, the condenser and the pump are successively inserted in the working fluid circulation path.

Preferably, in the waste heat utilization device, the cooling water circuit further includes flow rate control means for causing the cooling water delivered from the engine to directly flow into the evaporator while bypassing the exhaust gas heat exchanger and the superheater, to regulate a flow rate of the cooling water flowing into the exhaust gas heat exchanger.

Preferably, in the waste heat utilization device, the cooling water circuit further includes temperature detection means for detecting cooling water temperature at an outlet of the exhaust gas heat exchanger, and the flow rate control means regulates the flow rate of the cooling water flowing into the exhaust gas heat exchanger in accordance with the cooling water temperature detected by the temperature detection means.

Preferably, in the waste heat utilization device, the flow rate control means increases the flow rate of the cooling water flowing into the exhaust gas heat exchanger when the cooling water temperature detected by the temperature detection means is higher than or equal to a preset temperature, and decreases the flow rate of the cooling water flowing into the exhaust gas heat exchanger when the cooling water temperature detected by the temperature detection means is lower than the preset temperature.

Preferably, in the waste heat utilization device, the expander is coupled with an electricity generator for converting the driving force produced by the expander to electric power, and the flow rate control means includes target temperature setting means for setting, as the preset temperature, a cooling water temperature corresponding to a predetermined target electricity generation amount, in accordance with a characteristic relation between the cooling water temperature detected by the temperature detection means and an amount of electric power generated by the electricity generator.

Preferably, in the waste heat utilization device, the target temperature setting means sets, as the preset temperature, a temperature lower than a deposition temperature of an additive added to the cooling water.

Preferably, in the waste heat utilization device, the exhaust gas heat exchanger includes a first heat exchange section and a second heat exchange section successively arranged along a flowing direction of the cooling water, the temperature detection means detects the cooling water temperature at an outlet of the first heat exchange section, and the cooling water circuit further includes gas-liquid separation means inserted between the first and second heat exchange sections for separating out a vapor produced as a result of evaporation of the cooling water in the first heat exchange section and for delivering the separated vapor to an inlet of the second heat exchange section.

Preferably, in the waste heat utilization device, the cooling water circuit further includes a cooling water pump driven by the engine to circulate the cooling water through the cooling water circulation path, and the flow rate control means includes a bypass passage branching off from a first passage constituting part of the cooling water circulation path and connecting between the engine and the exhaust gas heat exchanger, to allow the cooling water delivered from the engine to directly flow into the evaporator while bypassing the exhaust gas heat exchanger and the superheater, and a linear pump inserted in a portion of the first passage closer to the exhaust gas heat exchanger than a branching point from which the bypass passage diverges, the linear pump being configured to be driven linearly in accordance with the cooling water temperature detected by the temperature detection means, wherein rotating speed of the linear pump is increased when the cooling water temperature detected by the temperature detection means is higher than or equal to the preset temperature, and is decreased when the cooling water temperature detected by the temperature detection means is lower than the preset temperature.

Preferably, in the waste heat utilization device, the cooling water circuit further includes a second passage constituting part of the cooling water circulation path and connecting between the superheater and the evaporator, and a pressure reducing valve inserted in the second passage.

Preferably, in the waste heat utilization device, the cooling water circuit further includes a check valve inserted in a portion of the first passage closer to the exhaust gas heat exchanger than the linear pump is, for preventing reverse flow of the cooling water from the exhaust gas heat exchanger toward the linear pump.

Advantageous Effects of the Invention

In the waste heat utilization device, preferably, the Rankine cycle includes the evaporator for causing heat to transfer from the cooling water delivered from the engine to the working fluid to evaporate the working fluid, and the superheater for causing heat to transfer from the cooling water delivered from the exhaust gas heat exchanger to the working fluid delivered from the evaporator, to superheat the working fluid. Thus, the working fluid is evaporated by the waste heat of the engine body and then superheated by the waste heat of the exhaust gas, whereby the degree to which the working fluid is superheated in the Rankine cycle is heightened, making it possible to increase the amount of energy recovered by the waste heat utilization device.

In the waste heat utilization device, preferably, the cooling water circuit includes the flow rate control means for causing the cooling water delivered from the engine to directly flow into the evaporator while bypassing the exhaust gas heat exchanger and the superheater, to regulate the flow rate of the cooling water flowing into the exhaust gas heat exchanger. Thus, by carrying out a simple control operation to reduce the flow rate of the cooling water flowing into the exhaust gas heat exchanger, it is possible to significantly raise the temperature of the cooling water flowing into the superheater, whereby the degree to which the working fluid is superheated in the Rankine cycle can be effectively heightened.

In the waste heat utilization device, preferably, the flow rate control means regulates the flow rate of the cooling water flowing into the exhaust gas heat exchanger in accordance with the cooling water temperature detected by the temperature detection means. It is therefore possible to avoid a situation where the flow rate of the cooling water flowing into the exhaust gas heat exchanger is so small that the temperature of the cooling water flowing into the superheater becomes excessively high, or the flow rate of the cooling water flowing into the exhaust gas heat exchanger is so large that the temperature of the cooling water flowing into the superheater becomes excessively low, thus making it possible to efficiently heighten the degree of superheating of the working fluid in the Rankine cycle.

In the waste heat utilization device, preferably, the flow rate control means increases the flow rate of the cooling water flowing into the exhaust gas heat exchanger when the cooling water temperature detected by the temperature detection means is higher than or equal to the preset temperature, and decreases the flow rate of the cooling water flowing into the exhaust gas heat exchanger when the cooling water temperature detected by the temperature detection means is lower than the preset temperature.

In the waste heat utilization device, preferably, the flow rate control means includes the target temperature setting means for setting, as the preset temperature, a cooling water temperature corresponding to the predetermined target electricity generation amount, in accordance with the characteristic relation between the cooling water temperature detected by the temperature detection means and the amount of electric power generated by the electricity generator. This makes it possible to set, as the preset temperature, a cooling water temperature up to which the electricity generation amount sharply increases with increase in the cooling water temperature, that is, high electricity generation efficiency is achieved, whereby the amount of electricity generated by the electricity generator and thus the amount of energy recovered by the waste heat utilization device can be increased more efficiently.

In the waste heat utilization device, preferably, the target temperature setting means sets, as the preset temperature, a temperature lower than the deposition temperature of the additive added to the cooling water. Since the additive is therefore not deposited inside the exhaust gas heat exchanger, lowering in the heat transfer performance of the exhaust gas heat exchanger due to deposition of the additive as well as lowering in corrosion inhibition performance of the cooling water can be prevented, making it possible to reliably increase the energy recovery amount of the waste heat utilization device.

In the waste heat utilization device, preferably, the cooling water circuit further includes the gas-liquid separation means inserted between the first and second heat exchange sections for separating out the vapor produced as a result of evaporation of the cooling water in the first heat exchange section and for delivering the separated vapor to the inlet of the second heat exchange section. Since the liquid containing the additive does not flow into the second heat exchange section, the cooling water, that is, the vapor of the cooling water can be superheated in the second heat exchange section to temperatures above the deposition temperature of the additive, making it possible to further heighten the degree to which the working fluid is superheated in the Rankine cycle.

In the waste heat utilization device, preferably, the flow rate control means includes the bypass passage branching off from the first passage constituting part of the cooling water circulation path and connecting between the engine and the exhaust gas heat exchanger, to allow the cooling water delivered from the engine to directly flow into the evaporator while bypassing the exhaust gas heat exchanger and the superheater, and the linear pump inserted in a portion of the first passage closer to the exhaust gas heat exchanger than the branching point from which the bypass passage diverges, the linear pump being configured to be driven linearly in accordance with the cooling water temperature detected by the temperature detection means, wherein the rotating speed of the linear pump is increased when the cooling water temperature detected by the temperature detection means is higher than or equal to the preset temperature, and is decreased when the cooling water temperature detected by the temperature detection means is lower than the preset temperature. Thus, even when the cooling water pump is stopped because of stoppage of the engine, the linear pump can be operated, in place of the cooling water pump, to circulate the cooling water through the exhaust gas heat exchanger if the temperature of the cooling water present in the exhaust gas heat exchanger is higher than or equal to the preset temperature. It is therefore possible to prevent the exhaust gas heat exchanger from being excessively heated by the residual heat of the exhaust gas because the cooling water pump is stopped and thus the cooling water is not passed through the exhaust gas heat exchanger, whereby damage to the exhaust gas heat exchanger is avoided. Since the exhaust gas heat exchanger, the cooling water circuit and accordingly, the waste heat utilization device can be protected as a result, operation reliability of the waste heat utilization device is ensured.

In the waste heat utilization device, preferably, the cooling water circuit further includes the second passage constituting part of the cooling water circulation path and connecting between the superheater and the evaporator, and the pressure reducing valve inserted in the second passage. Thus, even if the cooling water boils while the linear pump is operating, the boiling cooling water is condensed by the superheater and then is delivered to the evaporator after the pressure thereof is reduced by the pressure reducing valve. Accordingly, the design of circuit withstanding pressure, which has to be based on the assumption that the cooling water boils in the exhaust gas heat exchanger, is needed only for a segment of the circulation path extending from the linear pump to the pressure reducing valve and including the exhaust gas heat exchanger and the superheater. Since the cooling water circuit and thus the waste heat utilization device can be protected with ease, the operation reliability of the waste heat utilization device can be easily secured.

In the waste heat utilization device, preferably, the cooling water circuit further includes the check valve inserted in a portion of the first passage closer to the exhaust gas heat exchanger than the linear pump is, for preventing reverse flow of the cooling water from the exhaust gas heat exchanger toward the linear pump. Thus, even if the cooling water pump is stopped because of stoppage of the engine and also if the linear pump is stopped while the cooling water present in the exhaust gas heat exchanger is boiling due to the residual heat of the exhaust gas, the boiling cooling water is reliably prevented from flowing from the exhaust gas heat exchanger back to the linear pump. Since the cooling water circuit and thus the waste heat utilization device can be reliably protected, the operation reliability of the waste heat utilization device can be secured with certainty.

MODE OF CARRYING OUT THE INVENTION

Embodiments of the present invention will be hereinafter described with reference to the accompanying drawings. A first embodiment will be explained first.

Figure 1:
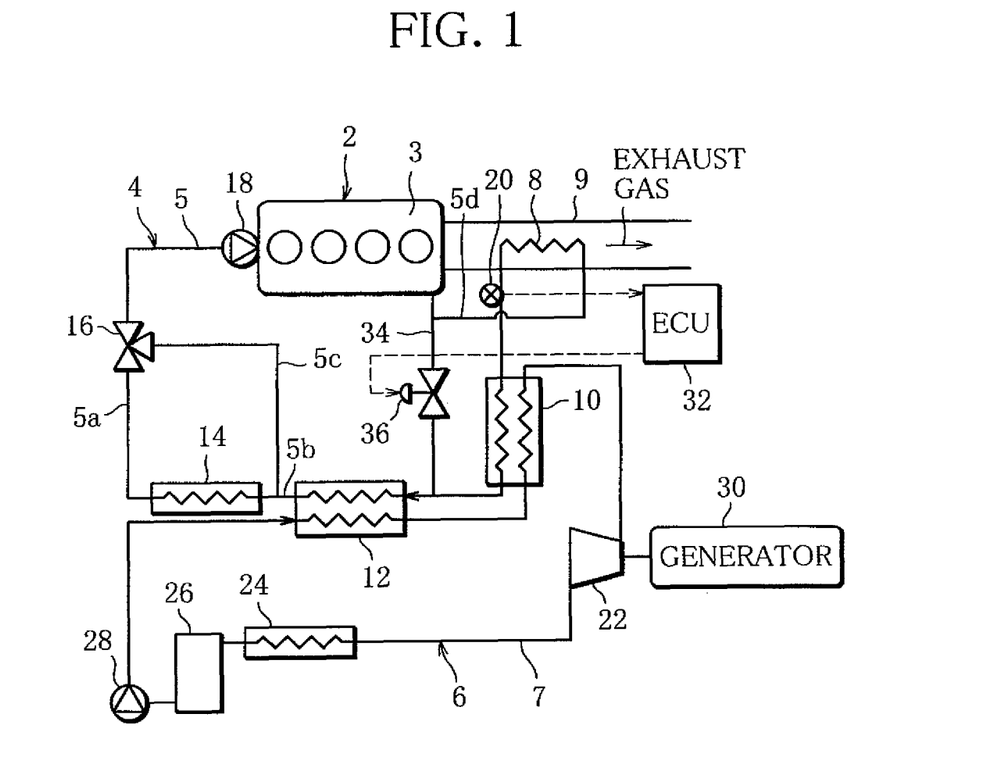
FIG. 1 is a schematic diagram illustrating a waste heat utilization device for an internal combustion engine according to a first embodiment of the present invention.

FIG. 1 schematically illustrates an exemplary waste heat utilization device for an internal combustion engine. The waste heat utilization device is mounted on a motor vehicle, for example, and comprises a cooling water circuit 4 for cooling an engine (internal combustion engine) 2 of the vehicle, and a Rankine cycle 6 (hereinafter referred to as RC circuit) for recovering waste heat of the engine 2.

The cooling water circuit 4 includes a circulation path 5 extending via the engine 2 for circulating cooling water (hereinafter referred to also as LLC) therethrough. An exhaust gas heat exchanger 8, a superheater 10, an evaporator 12, a radiator 14, a thermostat 16 and a cooling water pump 18 are successively inserted in the circulation path 5 along the flowing direction of the cooling water to constitute a closed circuit.

The exhaust gas heat exchanger 8 transfers heat from exhaust gas, which is discharged into an exhaust pipe 9 from the engine 2, to the cooling water (e.g., at 95° C.), which is delivered from the engine 2 and has been heated while cooling a cylinder block (engine body) 3 of the engine 2, to additionally heat the cooling water up to a preset temperature Ts (e.g., 130° C.) so that the cooling water may boil.

A temperature sensor (temperature detection means) 20 is attached to a portion of the circulation path 5 between the exhaust gas heat exchanger 8 and the superheater 10, to detect cooling water temperature Tc at the outlet of the exhaust gas heat exchanger 8.

The radiator 14 is connected in series with the evaporator 12 and transfers heat from the cooling water, which has been cooled due to the absorption of heat by a refrigerant in the evaporator 12, to outside air or the like, in order to further cool the cooling water.

The thermostat 16 is a mechanical three-way valve for controlling the amount of the cooling water flowing into the radiator 14 in accordance with the temperature of the cooling water flowing through the thermostat 16. The thermostat 16 has two inlet ports and one outlet port. The two inlet ports are connected respectively with a passage 5a of the circulation path 5 extending from the radiator 14 and a radiator-bypassing passage 5c of the circulation path 5. The radiator-bypassing passage 5c extends from a passage 5b of the circulation path 5 connecting between the evaporator 12 and the radiator 14 and is connected to the thermostat 16 so as to bypass the radiator 14. The amount of the cooling water passed through the radiator 14 is increased or decreased in accordance with the cooling water temperature so that the cooling water temperature and thus the temperature of the cylinder block 3 may be kept at a proper temperature.

The cooling water pump 18, which is a mechanical pump, is mounted to the engine 2 and driven by the rotation of the engine 2 so that the cooling water may be appropriately circulated through the cooling water circuit 4.

The RC circuit 6, on the other hand, includes a circulation path 7 for circulating the refrigerant serving as a working fluid, such as R134a. The evaporator 12, the superheater 10, an expander 22, a condenser 24, a gas-liquid separator 26 and a refrigerant pump (pump) 28 are successively inserted in the circulation path 7 along the flowing direction of the refrigerant to constitute a closed circuit.

The evaporator 12 transfers heat from the cooling water (e.g., at 110° C.) circulated successively through the engine 2, the exhaust gas heat exchanger 8 and the superheater 10, to the refrigerant fed under pressure from the refrigerant pump 28, to cause the refrigerant to evaporate at a predetermined evaporation temperature (e.g., 90° C.). Since the heat of the cooling water is absorbed due to the evaporation of the refrigerant, the cooling water temperature drops, for example, to 100° C.

The superheater 10 transfers heat from the cooling water (130° C.) delivered from the exhaust gas heat exchanger 8, to the refrigerant delivered from the evaporator 12 so that the refrigerant may be superheated (e.g., at 110° C.).

The expander 22 is a rotating device for producing a driving force by expanding the superheated refrigerant delivered from the superheater 10. The expander 22 is mechanically coupled with an electricity generator 30, which converts the driving force produced by the expander 22 to electric power so that the generated electric power may be used by devices external to the waste heat utilization device.

The condenser 24 is a heat radiator for transferring heat from the refrigerant delivered from the expander 22 to the outside air or the like, to condense the refrigerant into a liquid phase.

The gas-liquid separator 26 separates the refrigerant condensed by the condenser 24 into two, gas and liquid phases and supplies only the separated liquid-phase refrigerant to the refrigerant pump 28.

The refrigerant pump 28 pressurizes the liquid-phase refrigerant separated by the gas-liquid separator 26 and feeds the refrigerant under pressure to the evaporator 12 so that the refrigerant may be appropriately circuited through the RC circuit 6.

The cooling water circuit 4 and the RC circuit 6 configured as described above are controlled by an ECU 32, which is an electronic control unit for performing integrated control of the vehicle. The ECU 32 is electrically connected with the driving section of the refrigerant pump 28.

The ECU 32 controls the operation of the refrigerant pump 28 in accordance with operating conditions of the engine 2, so that the waste heat utilization device recovers waste heat of the engine 2, that is, waste heat of the cylinder block 3 and waste heat of the exhaust gas, through the medium of the cooling water. In the RC circuit 6, the refrigerant is evaporated in the evaporator 12 by the waste heat of the cylinder block 3 and then is superheated in the superheater 10 by the heat of the exhaust gas. The refrigerant thus heated in stages into a superheated state is supplied to the expander 22 so that the electricity generator 30 may generate energy available to devices external to the waste heat utilization device.

The cooling water circuit 4 includes a bypass passage 34, which allows the cooling water from the engine 2 to flow directly into the evaporator 12 while bypassing the exhaust gas heat exchanger 8 and the superheater 10.

A flow regulating valve 36 is inserted in the bypass passage 34 to regulate the flow rate of the cooling water flowing through the bypass passage 34, and has a driving section electrically connected to the ECU 32. The aforementioned temperature sensor 20 is also electrically connected to the ECU 32.

In accordance with the input signal from the temperature sensor 20, the ECU 32 outputs a drive signal to the driving section of the flow regulating valve 36, to perform flow rate control by regulating the flow rate of the cooling water flowing through the bypass passage 34 and thereby controlling the flow rate of the cooling water flowing into the exhaust gas heat exchanger 8 (flow rate control means).

Figure 2:
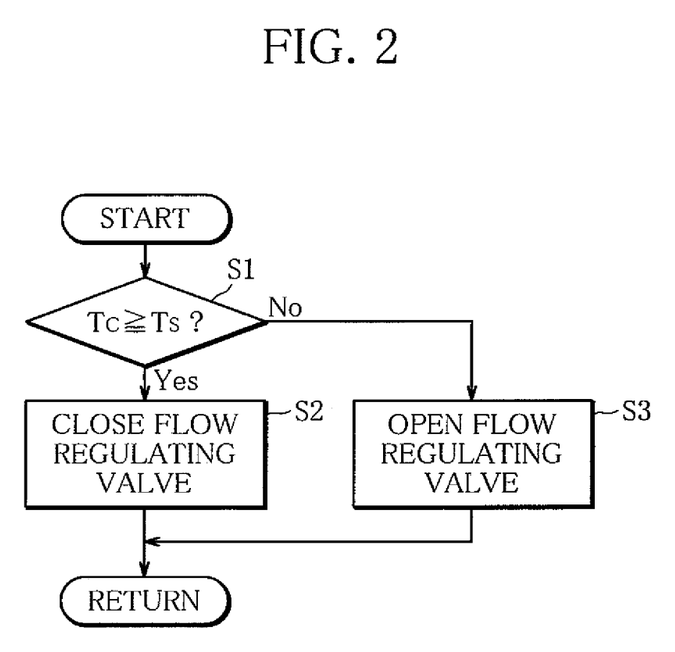
FIG. 2 is a flowchart illustrating a flow rate control routine executed by an ECU shown in FIG. 1.

Referring now to the flowchart of FIG. 2, a control routine for the flow rate control will be explained.

Upon start of the flow rate control, the control routine first proceeds to S1, in which it is determined whether or not the cooling water temperature Tc detected by the temperature sensor 20 indicates a value higher than or equal to the preset temperature Ts (Tc≥Ts). If the result of the decision is affirmative (Yes), that is, if it is judged that the relation Tc≥Ts is fulfilled, the control routine proceeds to S2. On the other hand, if the result of the decision is negative (No), that is, if it is judged that the relation Tc≥Ts is not fulfilled, the control routine proceeds to S3.

In S2, the flow regulating valve 36 is driven in the valve closing direction, whereupon the control routine returns.

On the other hand, in S3, the flow regulating valve 36 is driven in the valve opening direction, whereupon the control routine returns.

In this manner, according to the flow rate control, the opening of the flow regulating valve 36 is controlled such that the flow rate Fe of the cooling water flowing into the exhaust gas heat exchanger 8 is increased when the cooling water temperature Tc detected by the temperature sensor 20 is higher than or equal to the preset temperature Ts. On the other hand, when the cooling water temperature Tc detected by the temperature sensor 20 is lower than the preset temperature Ts, the flow rate Fe of the cooling water flowing into the exhaust gas heat exchanger 8 is decreased.

Figure 3:
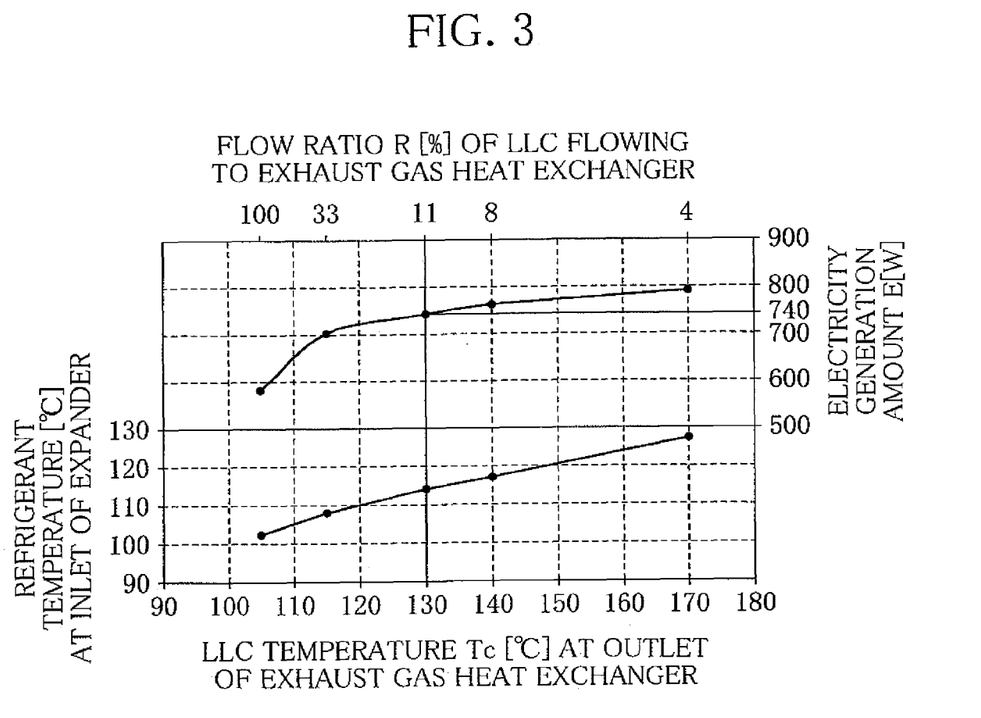
FIG. 3 is a characteristic diagram illustrating the relationship among a ratio R (%) of the flow rate Fe of cooling water flowing into an exhaust gas heat exchanger to a total flow rate, cooling water temperature Tc (° C.) detected by a temperature sensor, and a target electricity generation amount (electricity generation amount) E (W) generated by an electricity generator.

FIG. 3 is a characteristic diagram illustrating the relationship among the ratio R (%) of the flow rate Fe to a total flow rate F of the cooling water delivered from the engine 2, the cooling water temperature Tc (° C.) detected by the temperature sensor 20, and the amount of electricity E (W) generated by the electricity generator 30.

In the aforementioned flow rate control, the preset temperature Ts is determined on the basis of the characteristic diagram as a cooling water temperature Tc corresponding to a predetermined electricity generation amount E (target temperature setting means).

Specifically, the characteristic diagram of FIG. 3 shows that the electricity generation amount E sharply increases as the cooling water temperature Tc rises up to about 120° C., and that after the cooling water temperature Tc becomes higher than about 120° C., the electricity generation amount E increases only gently with increase in the cooling water temperature Tc.

Also, the cooling water contains additives serving as a corrosion inhibitor, such as phosphoric acids, carboxylic acids, triazoles and silicates. If the flow ratio R is close to 0%, in other words, if the LLC completely evaporates, the corrosion inhibitor is undesirably deposited.

Thus, in the flow rate control according to the present invention, a target value of the electricity generation amount E is set to about 740 (W), and the flow regulating valve 36 is controlled such that the flow ratio R is approximately 11% when the cooling water temperature Tc detected by the temperature sensor 20 is equal to the preset temperature Ts of 130° C., which is higher than the cooling water temperature Tc of 120° C. to allow an appropriate margin.

As described above, according to the first embodiment, the refrigerant is evaporated by the waste heat of the cylinder block 3 and is then superheated by the waste heat of the exhaust gas. This permits the RC circuit 6 to efficiently heat a larger amount of refrigerant in stages into a superheated state, thus making it possible to enhance the degree of superheating of the refrigerant and increase the amount of energy recovered by the waste heat utilization device.

Also, in the above flow rate control, the cooling water temperature Tc at the outlet of the exhaust gas heat exchanger 8, in other words, the temperature of the cooling water flowing into the superheater 10, can be substantially increased up to 130° C. by a simple control operation in which the ratio of the flow rate Fe of the cooling water flowing into the exhaust gas heat exchanger 8 to the total flow rate F is reduced to about 11%. Accordingly, the degree to which the refrigerant is superheated in the RC circuit 6 can be effectively heightened.

Further, according to the aforementioned flow rate control, the flow rate Fe of the cooling water flowing into the exhaust gas heat exchanger 8 is controlled in accordance with the cooling water temperature Tc detected by the temperature sensor 20, so that a situation can be avoided where the flow rate Fe is so small that the temperature Tc of the cooling water flowing into the superheater 10 becomes excessively high or where the flow rate Fe is so large that the temperature Tc of the cooling water flowing into the superheater 10 becomes excessively low. Also for this reason, the degree to which the refrigerant is superheated in the RC circuit 6 can be efficiently heightened.

Furthermore, in the above flow rate control, the cooling water temperature Tc of 130° C. is determined, on the basis of the characteristic diagram of FIG. 3, as the temperature up to which the electricity generation amount E sharply rises with increase in the cooling water temperature Tc, that is, high electricity generation efficiency is achieved, and this temperature 130° C. is set as the preset temperature Ts. It is therefore possible to efficiently increase the amount of electricity generated by the electricity generator 30 and thus the energy recovery amount of the waste heat utilization device.

According to the aforementioned flow rate control, moreover, the preset temperature Ts is set to a temperature lower than the temperature at which the cooling water is completely evaporated. Accordingly, the additives in the cooling water are not deposited inside the exhaust gas heat exchanger 8, thus reliably preventing lowering in the heat transfer performance of the exhaust gas heat exchanger 8 due to the deposited additives as well as lowering in the corrosion inhibition performance of the cooling water. It is therefore possible to reliably increase the energy recovery amount of the waste heat utilization device.

A second embodiment of the present invention will be now described.

Figure 4:
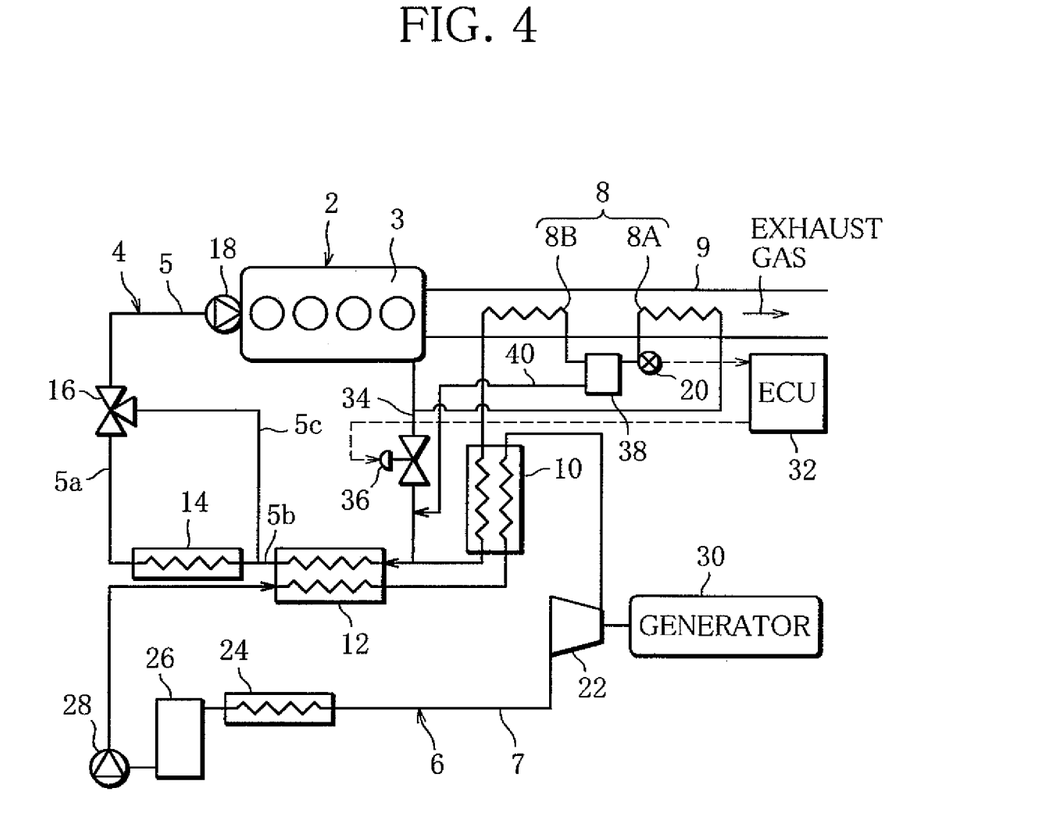
FIG. 4 is a schematic diagram illustrating a waste heat utilization device for an internal combustion engine according to a second embodiment of the present invention.

FIG. 4 schematically illustrates a waste heat utilization device for an internal combustion engine according to the second embodiment.

The second embodiment differs from the first embodiment in that the heat exchange section of the exhaust gas heat exchanger 8 is divided into two parts. In the other respects, the configuration of the second embodiment is identical with that of the first embodiment.

The heat exchange section of the exhaust gas heat exchanger 8 is divided into a first heat exchange section 8A and a second heat exchange section 8B, which are successively arranged along the flowing direction of the cooling water. A gas-liquid separator 38 is inserted between the first and second heat exchange sections 8A and 8B.

The gas-liquid separator 38 separates the cooling water delivered from the first heat exchange section 8A into gas and liquid phases, and returns only the liquid-phase cooling water containing the additives to the inlet of the evaporator 12 through a return passage 40 extending therefrom to the inlet of the evaporator 12 (gas-liquid separation means).

The temperature sensor 20 is attached to a passage between the first heat exchange section 8A and the gas-liquid separator 38, to detect the cooling water temperature Tc at the outlet of the first heat exchange section 8A. In accordance with this cooling water temperature Tc, the flow rate control is performed to regulate the flow rate Fe of the cooling water flowing into the exhaust gas heat exchanger 8.

Thus, in the second embodiment, the degree to which the refrigerant is superheated in the RC circuit 6 can be raised to significantly increase the amount of energy recovered by the waste heat utilization device, like the first embodiment.

In particular, according to the second embodiment, the cooling water, that is, the vapor from which the additives have been separated out by the gas-liquid separator 38, can be additionally heated in the second heat exchange section 8B up to temperatures above the deposition temperature of the additives, to produce superheated vapor. Accordingly, the temperature Tc of the cooling water flowing into the superheater 10 can be raised to the maximum while at the same time preventing deposition of the additives inside the exhaust gas heat exchanger 8 as well as lowering in the corrosion inhibition performance of the cooling water.

A third embodiment of the present invention will be now described.

Figure 5:
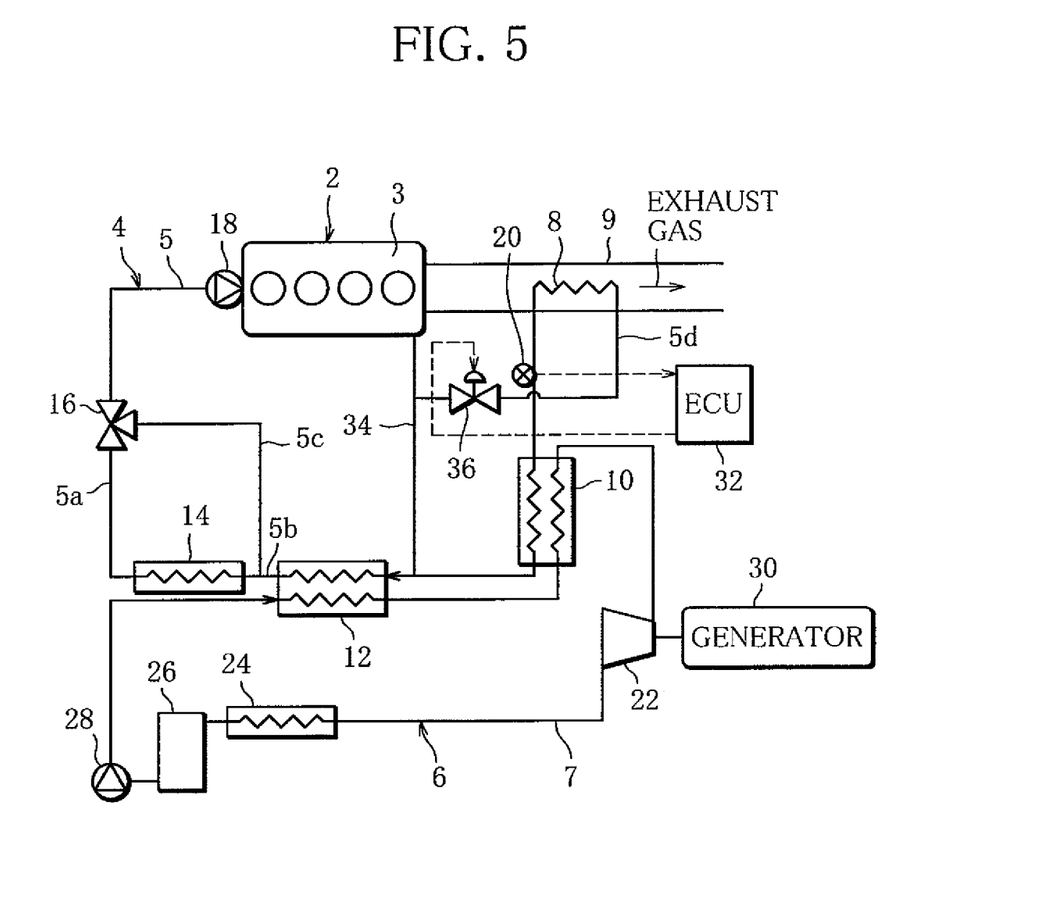
FIG. 5 is a schematic diagram illustrating a waste heat utilization device for an internal combustion engine according to a third embodiment of the present invention.

FIG. 5 schematically illustrates a waste heat utilization device for an internal combustion engine according to the third embodiment.

According to the third embodiment, the flow regulating valve 36 is inserted in the passage leading to the exhaust gas heat exchanger 8, as distinct from the first embodiment. In the other respects, the configuration of the third embodiment is identical with that of the first embodiment.

Specifically, the bypass passage 34 branches off from a passage (first passage) 5d of the circulation path 5 connecting between the engine 2 and the exhaust gas heat exchanger 8, and the flow regulating valve 36 is inserted in a portion of the passage 5d closer to the exhaust gas heat exchanger 8 than the branching point from which the bypass passage 34 diverges.

The ECU 32 outputs a drive signal to the driving section of the flow regulating valve 36 in accordance with the input signal from the temperature sensor 20, to execute flow rate control similar to those of the foregoing embodiments (flow rate control means).

During the flow rate control, the flow regulating valve 36 is controlled so as to operate in a manner reverse to that of the flow regulating valve 36 of the foregoing embodiments. Specifically, when the cooling water temperature Tc is higher than or equal to the preset temperature Ts (Tc≥Ts) and thus it is judged that the relation Tc≥Ts is fulfilled, the flow regulating valve 36 is driven in the valve opening direction to increase the flow rate Fe of the cooling water flowing into the exhaust gas heat exchanger 8, and when it is judged that the relation Tc≥Ts is not fulfilled, the flow regulating valve 36 is driven in the valve closing direction to decrease the flow rate Fe of the cooling water flowing into the exhaust gas heat exchanger 8, so that the flow ratio R may be about 11% when the cooling water temperature is equal to the preset temperature Ts of 130°.

Thus, according to the third embodiment, the degree to which the refrigerant is superheated in the RC circuit 6 can be heightened to substantially increase the energy recovery amount of the waste heat utilization device, like the foregoing embodiments.

In the third embodiment, the flow rate control is performed in the same manner as in the above embodiments such that the cooling water is made to flow into the exhaust gas heat exchanger 8 at a small flow rate with the flow ratio R set to about 11%. Since, in the third embodiment in particular, the flow regulating valve 36 is inserted in the portion of the passage 5d closer to the exhaust gas heat exchanger 8 than the branching point from which the bypass passage 34 diverges, the effective flow area of the flow regulating valve 36 may be small, compared with the case where the flow regulating valve 36 is inserted in the bypass passage 34, whereby the flow regulating valve 36 can be reduced in size. It is therefore possible to reduce the costs of the flow regulating valve 36, the cooling water circuit 4 and thus the waste heat utilization device.

A fourth embodiment of the present invention will be now described.

Figure 6:
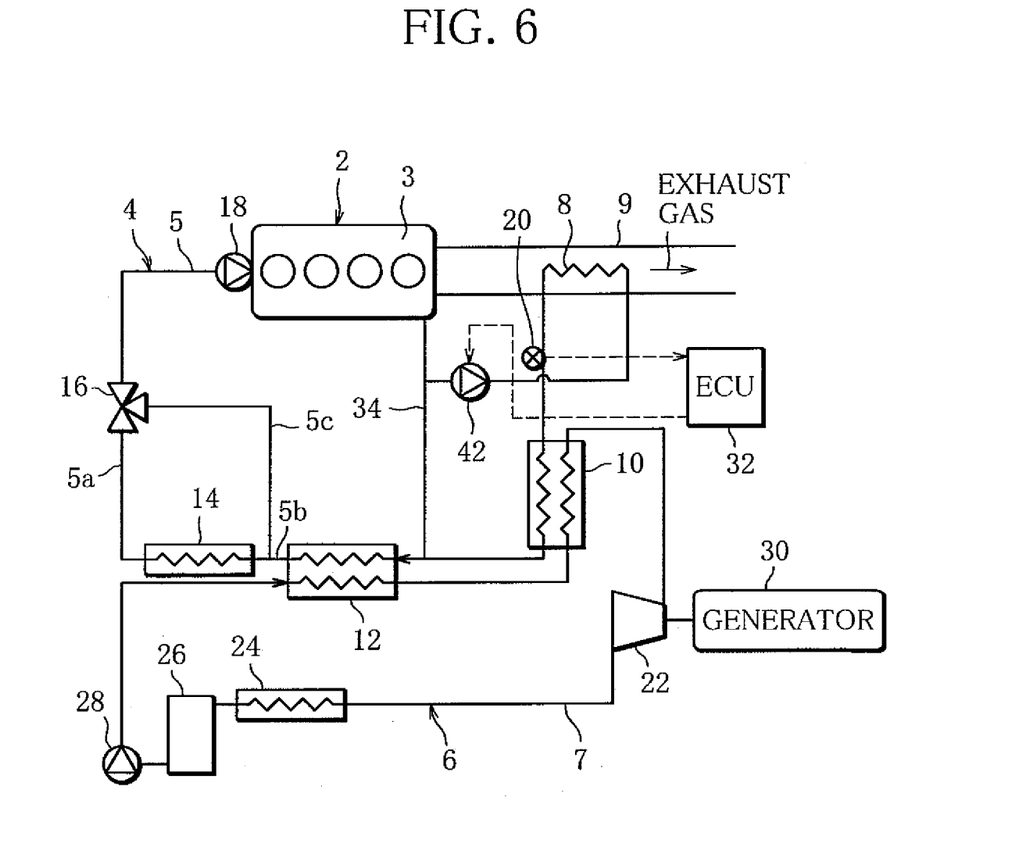
FIG. 6 is a schematic diagram illustrating a waste heat utilization device for an internal combustion engine according to a fourth embodiment of the present invention.

FIG. 6 schematically illustrates a waste heat utilization device for an internal combustion engine according to the fourth embodiment.

The fourth embodiment differs from the third embodiment in that the flow regulating valve 36 is replaced by a linear pump 42. In the other respects, the configuration of the fourth embodiment is identical with that of the third embodiment.

The linear pump 42 is an electric pump having a driving section electrically connected to the ECU 32 so that the linear pump 42 may be driven linearly in accordance with the cooling water temperature Tc detected by the temperature sensor 20.

The ECU 32 outputs a drive signal to the driving section of the linear pump 42 in accordance with the input signal from the temperature sensor 20, to perform flow rate control similar to those executed by the above embodiments (flow rate control means).

During the flow rate control, the linear pump 42 is controlled in the following manner: When the cooling water temperature Tc is higher than or equal to the preset temperature Ts (Tc≥Ts) and thus it is judged that the relation Tc≥Ts is fulfilled, the rotating speed of the linear pump 42 is raised to increase the flow rate Fe of the cooling water flowing into the exhaust gas heat exchanger 8, and when it is judged that the relation Tc≥Ts is not fulfilled, the rotating speed of the linear pump 42 is lowered to decrease the flow rate Fe of the cooling water flowing into the exhaust gas heat exchanger 8, so that the flow ratio R may be approximately 11% when the cooling water temperature is equal to the preset temperature Ts of 130°.

In this manner, according to the fourth embodiment, the degree of superheating of the refrigerant in the RC circuit 6 can be raised to significantly increase the amount of energy recovered by the waste heat utilization device, like the foregoing embodiments.

Especially, in the fourth embodiment, even when the cooling water pump 18 is stopped due to stoppage of the engine 2, the linear pump 42 can be operated, in place of the cooling water pump 18, to circulate the cooling water through the exhaust gas heat exchanger 8 if the cooling water present in the exhaust gas heat exchanger 8 is at a temperature higher than or equal to the preset temperature Ts. It is therefore possible to avoid a situation where the exhaust gas heat exchanger 8 is excessively heated by the residual heat of the exhaust gas because the cooling water is not circulated through the exhaust gas heat exchanger 8 due to stoppage of the cooling water pump 18, thereby preventing damage to the exhaust gas heat exchanger 8. Since the exhaust gas heat exchanger 8, the cooling water circuit 4 and thus the waste heat utilization device can be protected, operation reliability of the waste heat utilization device can be ensured.

A fifth embodiment of the present invention will be now described.

Figure 7:
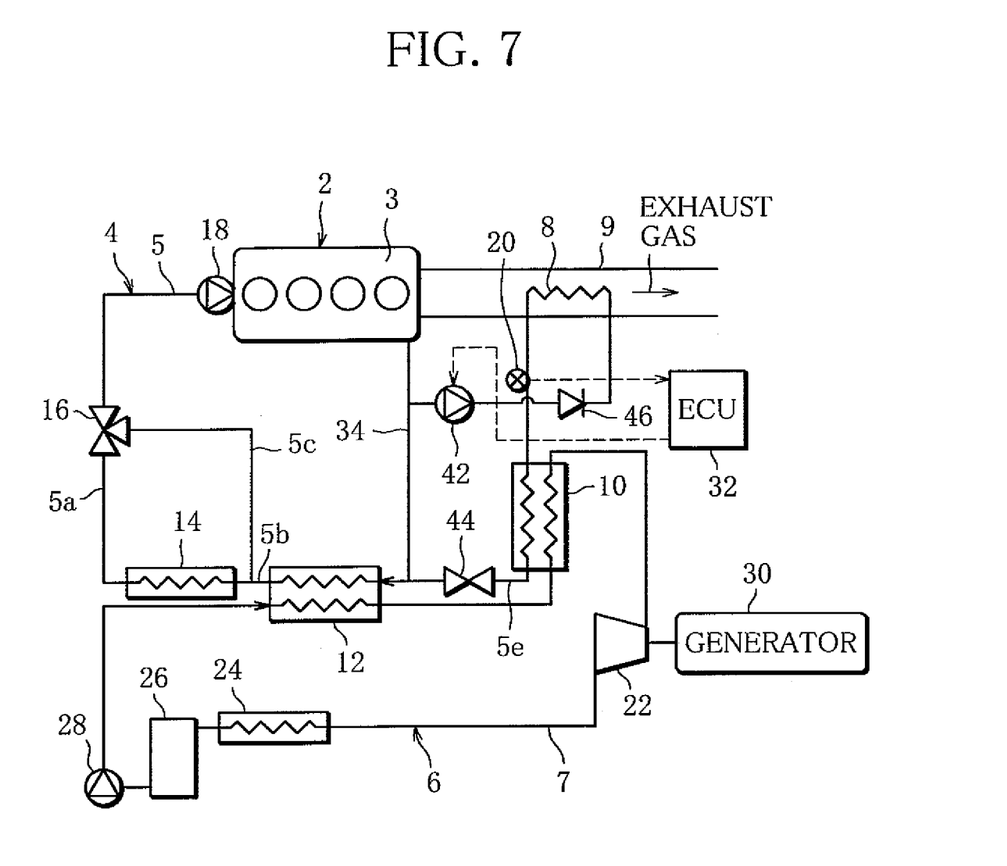
FIG. 7 is a schematic diagram illustrating a waste heat utilization device for an internal combustion engine according to a fifth embodiment of the present invention.

FIG. 7 schematically illustrates a waste heat utilization device for an internal combustion engine according to the fifth embodiment.

The fifth embodiment differs from the fourth embodiment in that a pressure reducing valve 44 is inserted in the circulation path 5 to be located between the superheater 10 and the evaporator 12 of the cooling water circuit 4, and that a check valve 46 is inserted in a portion of the passage 5d closer to the exhaust gas heat exchanger 8 than the linear pump 42 is. In the other respects, the configuration of the fifth embodiment is identical with that of the fourth embodiment.

Specifically, the pressure reducing valve 44 is inserted in a passage (second passage) 5e of the circulation path 5 connecting between the superheater 10 and the evaporator 12, to reduce the pressure P of the cooling water delivered from the superheater 10 to a preset pressure Ps so that the cooling water with the reduced pressure Ps may be supplied to the evaporator 12.

The check valve 46 is inserted in that portion of the passage 5d which is closer to the exhaust gas heat exchanger 8 than the linear pump 42 is, to prevent the cooling water from flowing backward from the exhaust gas heat exchanger 8 to the linear pump 42.

In this manner, according to the fifth embodiment, the degree to which the refrigerant is superheated in the RC circuit 6 can be raised to significantly increase the amount of energy recovery by the waste heat utilization device, like the foregoing embodiments.

Especially, in the fifth embodiment, even if the cooling water boils while the linear pump 42 is operating, the boiling cooling water is condensed by the superheater 10 and is then supplied to the evaporator 12 after the pressure thereof is reduced by the pressure reducing valve 44. Accordingly, the design of circuit withstanding pressure, which has to be based on the assumption that the cooling water boils in the exhaust gas heat exchanger 8, is needed only for a segment of the circulation path 5 extending from the linear pump 42 to the pressure reducing valve 44 and including the exhaust gas heat exchanger 8 and the superheater 10.

Also, even if the linear pump 42 is stopped while the cooling water present in the exhaust gas heat exchanger 8 is boiling, reverse flow of the boiling cooling water from the exhaust gas heat exchanger 8 to the linear pump 42 can be reliably prevented. Thus, since the cooling water circuit 4 and thus the waste heat utilization device can be reliably protected with ease, the operation reliability of the waste heat utilization device can be easily secured.

While the various embodiments of the present invention have been described above, it is to be noted that the present invention is not limited to the foregoing embodiments alone and may be modified in various ways without departing from the spirit and scope of the invention.

For example, in the above embodiments, the waste heat utilization device is mounted on the motor vehicle equipped with the engine 2 as a drive source. Alternatively, the waste heat utilization device may be mounted on a hybrid vehicle of which the drive source is constituted by the combination of the engine 2 and an electric motor, not shown. In the hybrid vehicle, the engine 2 is frequently stopped each time the drive source of the vehicle is switched from the engine 2 to the electric motor, with the result that the cooling water pump 18 is also frequently stopped. According to the aforementioned fourth and fifth embodiments in particular, since the flow rate control is executed by using the linear pump 42 as stated above, the cooling water circuit 4 and thus the waste heat utilization device can be reliably protected with ease, providing the advantage that the operation reliability of the waste heat utilization device can be secured.

EXPLANATION OF REFERENCE SIGNS 2 engine (internal combustion engine)
3 cylinder block (engine body)
4 cooling water circuit
5 circulation path for cooling water
5d passage (first passage)
5e passage (second passage)
6 Rankine cycle
7 circulation path for working fluid
8 exhaust gas heat exchanger
8A first heat exchange section
8B second heat exchange section
10 superheater
12 evaporator
18 cooling water pump
20 temperature sensor (temperature detection means)
22 expander
24 condenser
28 pump
30 electricity generator
32 ECU (flow rate control means, target temperature setting means)
34 bypass passage (flow rate control means)
36 flow regulating valve (flow rate control means)
38 gas-liquid separator (gas-liquid separation means)
40 return passage (gas-liquid separation means)
42 linear pump (flow rate control means)
44 pressure reducing valve
46 check valve

The invention claimed is:

1. A waste heat utilization device for an internal combustion engine, comprising:
   a cooling water circuit including a circulation path configured to circulate cooling water therethrough via the engine, and an exhaust gas heat exchanger inserted in the circulation path configured to cause heat to transfer from exhaust gas discharged from the engine to a part of the cooling water which has been heated while cooling a body of the engine, to additionally heat the cooling water; and
   a Rankine cycle including a circulation path configured to circulate a working fluid therethrough, an evaporator configured to cause heat to transfer from the cooling water delivered from the engine to the working fluid to evaporate the working fluid, a superheater configured to cause heat to transfer from the cooling water delivered from the exhaust gas heat exchanger to the working fluid delivered from the evaporator to superheat the working fluid, an expander configured to expand the working fluid delivered from the superheater to produce driving force, a condenser configured to condense the working fluid delivered from the expander, and a pump configured to feed the working fluid delivered from the condenser to the evaporator, wherein the evaporator, the superheater, the expander, the condenser and the pump are successively arranged in the working fluid circulation path,
   wherein:
   the cooling water circuit further includes flow rate control means for causing the cooling water delivered from the engine to directly flow into the evaporator while bypassing the exhaust gas heat exchanger and the superheater, to regulate a flow rate of the cooling water flowing into the exhaust gas heat exchanger; and a temperature sensor configured to detect cooling water temperature at an outlet of the exhaust gas heat exchanger, and
   the flow rate control means regulates the flow rate of the cooling water flowing into the exhaust gas heat exchanger in accordance with the cooling water temperature detected by the temperature sensor, to cause heat transfer from the exhaust gas to the cooling water so that the cooling water may boil.

2. The waste heat utilization device according to claim 1, wherein the flow rate control means regulates the flow rate of the cooling water flowing into the exhaust gas heat exchanger in accordance with the cooling water temperature detected by the temperature sensor, to cause heat transfer from the exhaust gas to the cooling water so that the cooling water temperature may be equal to or higher than a boiling temperature of the cooling water and lower than a temperature at which the cooling water is completely evaporated.

3. The waste heat utilization device according to claim 2, wherein the flow rate control means increases the flow rate of the cooling water flowing into the exhaust gas heat exchanger when the cooling water temperature detected by the temperature sensor is higher than or equal to a preset temperature, and decreases the flow rate of the cooling water flowing into the exhaust gas heat exchanger when the cooling water temperature detected by the temperature sensor is lower than the preset temperature.

4. The waste heat utilization device according to claim 3, wherein:
   the expander is coupled with an electricity generator for converting the driving force produced by the expander to electric power, and
   the flow rate control means includes target temperature setting means for setting, as the preset temperature, a cooling water temperature corresponding to a predetermined target electricity generation amount, in accordance with a characteristic relation between the cooling water temperature detected by the temperature sensor and an amount of electric power generated by the electricity generator.

5. The waste heat utilization device according to claim 4, wherein the target temperature setting means sets, as the preset temperature, a temperature lower than a deposition temperature of an additive added to the cooling water.

6. The waste heat utilization device according to claim 5, wherein:
   the exhaust gas heat exchanger includes a first heat exchange section and a second heat exchange section successively arranged along a flowing direction of the cooling water,
   the temperature sensor detects the cooling water temperature at an outlet of the first heat exchange section, and
   the cooling water circuit further includes gas-liquid separation means inserted between the first and second heat exchange sections for separating out a vapor produced as a result of evaporation of the cooling water in the first heat exchange section and for delivering the separated vapor to an inlet of the second heat exchange section.

7. The waste heat utilization device according to claim 3, wherein:
   the cooling water circuit further includes a cooling water pump driven by the engine and configured to circulate the cooling water through the cooling water circulation path,
   a first passage constituting part of the cooling water circulation path connects between the engine and the exhaust gas heat exchanger,
   the flow rate control means includes a bypass passage branching off from the first passage to allow the cooling water delivered from the engine to directly flow into the evaporator while bypassing the exhaust gas heat exchanger and the superheater, and
   a linear pump is arranged in a portion of the first passage closer to the exhaust gas heat exchanger than a branching point from which the bypass passage diverges,
   the linear pump being configured to be driven linearly in accordance with the cooling water temperature detected by the temperature sensor, wherein rotating speed of the linear pump is increased when the cooling water temperature detected by the temperature sensor is higher than or equal to the preset temperature, and is decreased when the cooling water temperature detected by the temperature sensor is lower than the preset temperature.

8. The waste heat utilization device according to claim 7, wherein the cooling water circuit further includes a second passage constituting part of the cooling water circulation path and connecting between the superheater and the evaporator, and a pressure reducing valve inserted in the second passage.

9. The waste heat utilization device according to claim 8, wherein the cooling water circuit further includes a check valve, inserted in a portion of the first passage closer to the exhaust gas heat exchanger than the linear pump is, configured to reverse flow of the cooling water from the exhaust gas heat exchanger toward the linear pump.

* * * * *